R. S. TROTT.
VEHICLE SPRING SUSPENSION.
APPLICATION FILED AUG. 1, 1914.

1,221,248.

Patented Apr. 3, 1917.
4 SHEETS—SHEET 1.

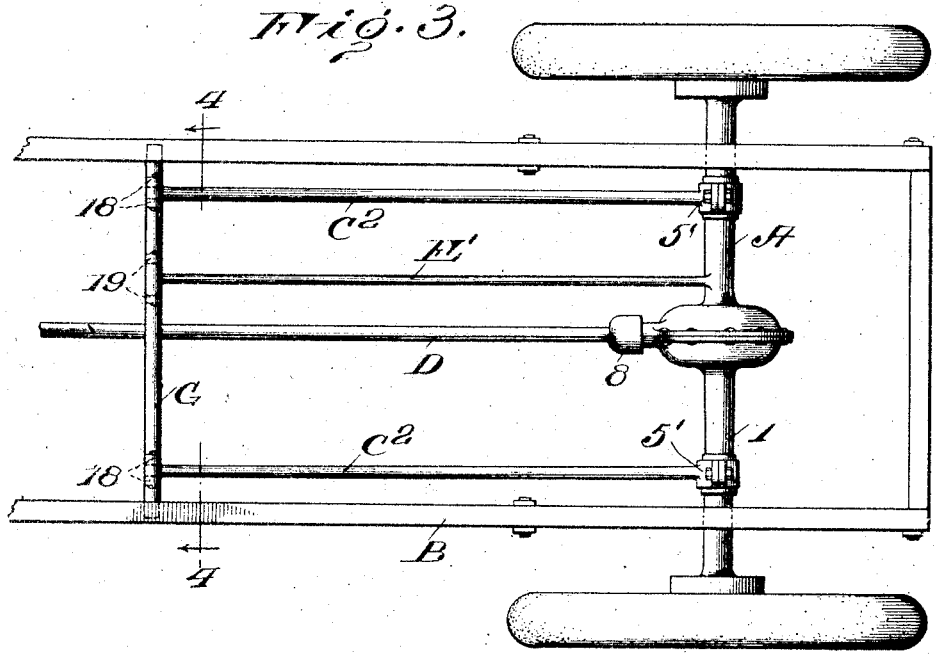
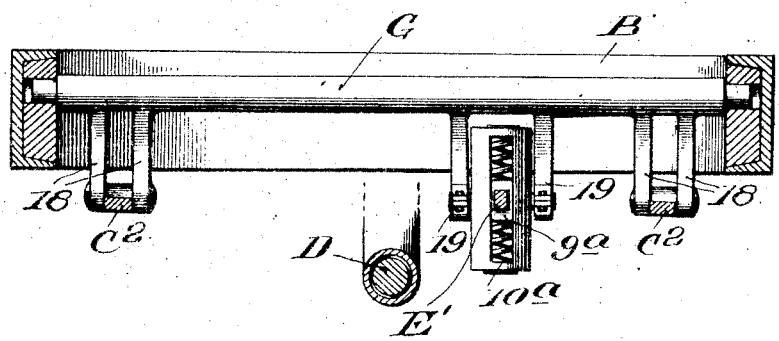

R. S. TROTT.
VEHICLE SPRING SUSPENSION.
APPLICATION FILED AUG. 1, 1914.

1,221,248.

Patented Apr. 3, 1917.
4 SHEETS—SHEET 3.

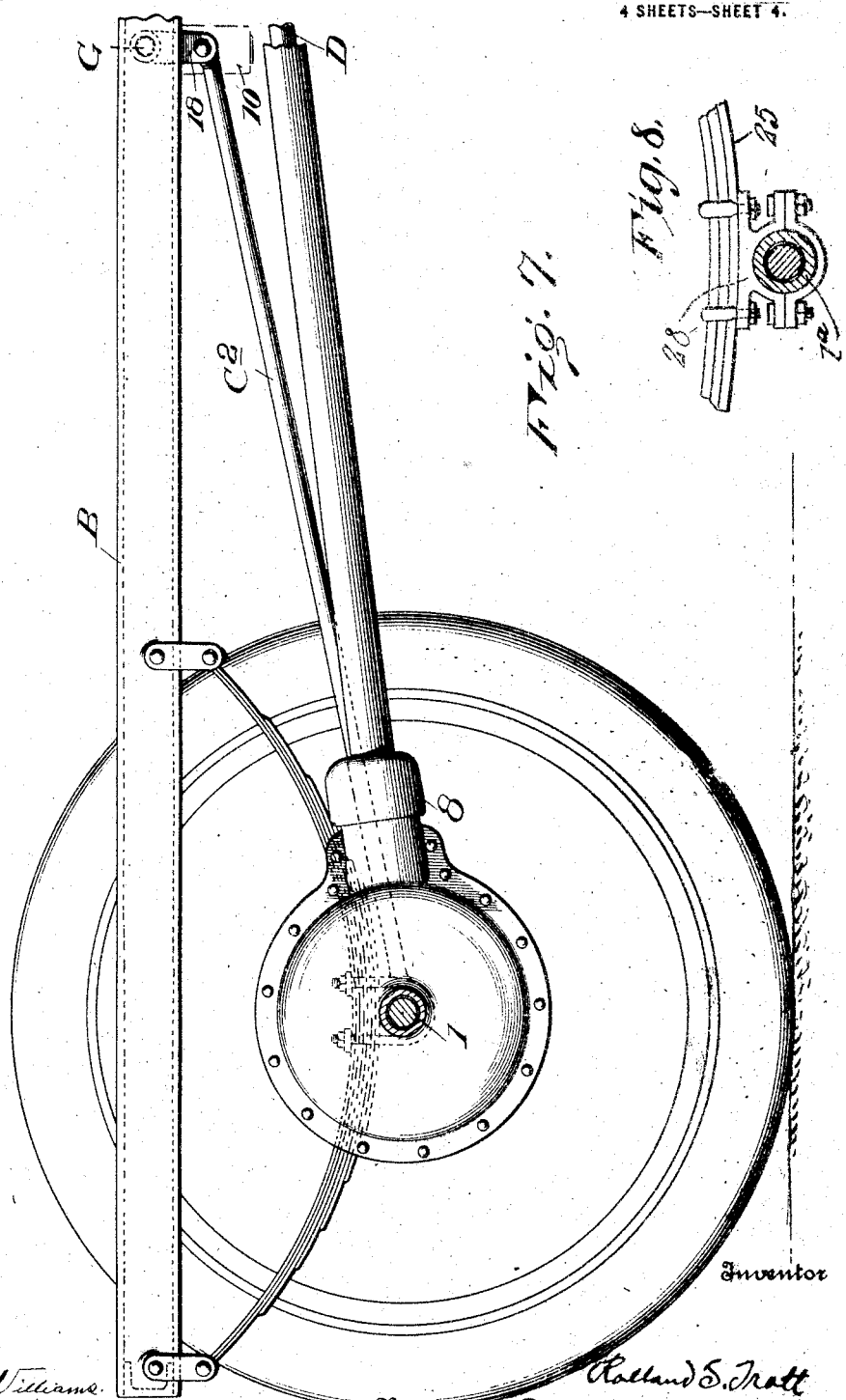

UNITED STATES PATENT OFFICE.

ROLLAND S. TROTT, OF DENVER, COLORADO.

VEHICLE SPRING SUSPENSION.

1,221,248.        Specification of Letters Patent.       Patented Apr. 3, 1917.

Application filed August 1, 1914. Serial No. 854,572.

*To all whom it may concern:*

Be it known that I, ROLLAND S. TROTT, a citizen of the United States, residing in the city and county of Denver and State of Colorado, have invented certain new and useful Improvements in Vehicle Spring Suspensions, of which the following is a specification.

My invention relates to an improvement in vehicle spring suspensions, and more particularly to a suspension adapted for use on the drive-axle of a self-propelled vehicle.

With a motor vehicle, when the clutch is thrown in to transmit power to the drive axle, a twisting strain is transmitted thereto, due to the inertia of the vehicle in repose. When a structure as that disclosed in my Patents Nos. 1,029,732 and 1,029,731, issued on June 18, 1912, is used, the axle is permitted to move forward with respect to its normal relation with the frame, and this in a measure alleviates the strain upon the axle. However, with this structure, when the wheels strike an obstruction, as for instance a rut in the road, the wheels pause momentarily until the load springs can compress sufficiently to take up the height of the obstruction. This pause of the wheels causes their rotation to cease, and as the driving power is applied continuously to the drive axle, a condition similar to that in starting is created.

It is the object of this invention to so construct the suspension that the axle and axle housing may have a turning movement with respect to the frame, and after the force exerting this turning movement is removed, will be brought back to normal.

A further object is to so connect the parts that the movement of the axle in the direction of the longitudinal extent of the frame to compensate for endwise shock and in a vertical path to take the load shocks is not interfered with.

This invention relates to still other novel features of construction and combinations of parts which will be hereinafter more fully described and pointed out in the claims.

In the accompanying drawings:

Figs. 2 and 3 are similar views showing modifications of the structure;

Fig. 4 is a sectional view through the frame on the line 4—4 of Fig. 3;

Fig. 7 is a fragmentary side elevation.

Fig. 8 is a sectional view showing the pivotal connection between the spring and the axle housing.

Figure 1:
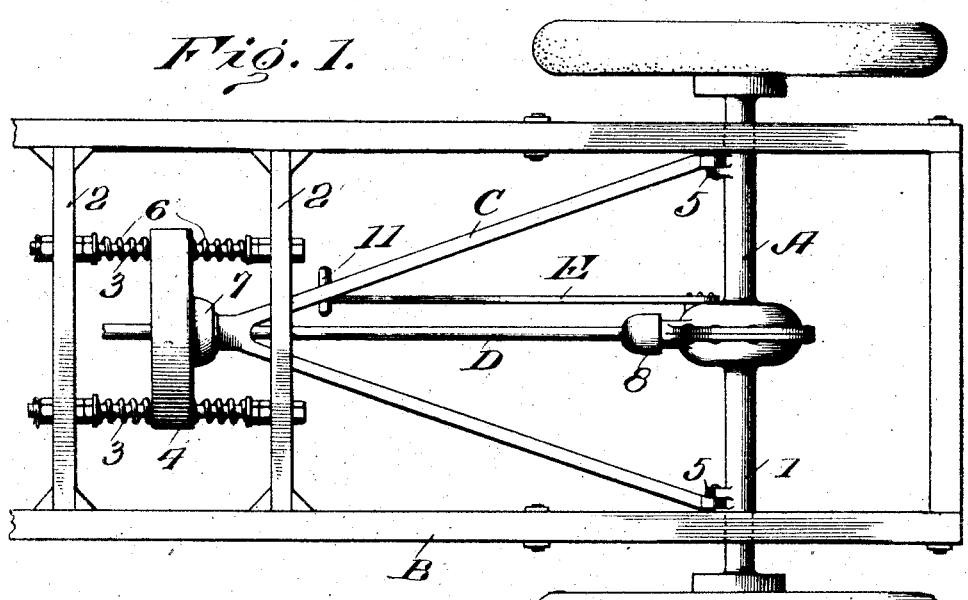
Figure 1 is a view in top plan, showing one adaptation of the invention.
Figure 2:
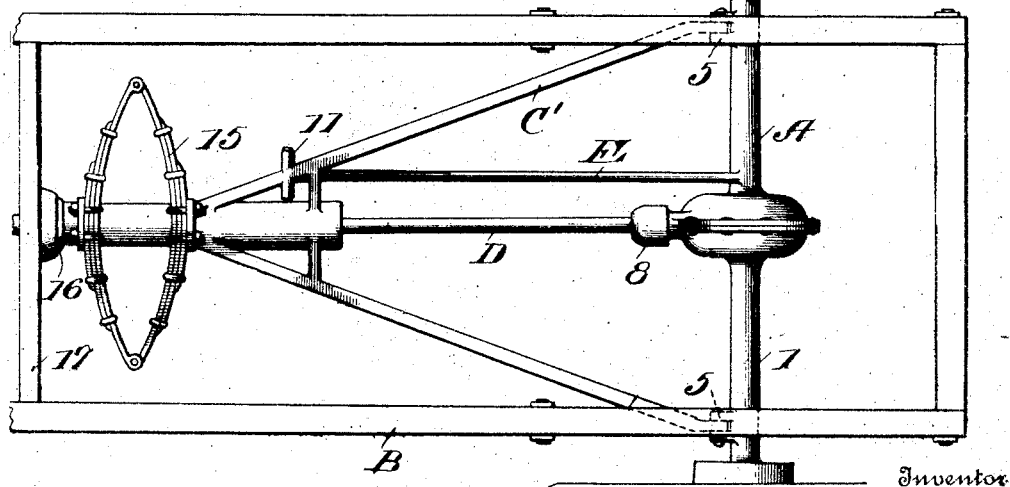

In the forms illustrated in Figs. 1, 2 and 3, any form of load-spring may be used, the essential point being that it is mounted between the frame and axle-housing 1 to permit movement of the axle-housing 1 in the direction of the longitudinal extent of the frame B, and a twisting movement of the axle-housing 1 with respect to its connection with the springs.

In Fig. 1, the cross members 2, 2, are connected between the side members to form a part of the frame B. Rods 3, 3, are mounted between the cross-members 2 to extend parallel with the side members of the frame. A cross-head 4 is mounted to slide on these rods 3.

A substantially V-shaped brace C is pivotally connected at its ends at 5, 5, near the ends of the axle-housing 1, and at the angle this reach or brace is connected by a universal joint 7 with the cross-head 4. Springs 6, 6, are mounted on each side of the cross-head 4 to resiliently oppose the sliding movement of this head.

A power shaft D extends from the drive axle up through the universal connection 7, and a universal joint 8 is provided in the power shaft D to permit the turning movement of the axle housing.

Figure 6:
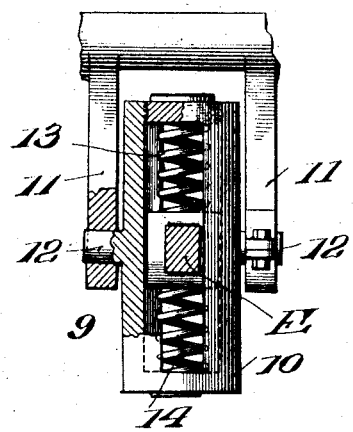
Fig. 6 is a detail view with parts in section to better illustrate the restoring means.

A torsion rod E is secured at its one end to the axle housing 1 to be rigid thereon, and the forward end of this torsion rod is connected to a slide block 9 mounted to slide in a yoke 10, as better shown in Fig. 6. The bearing brackets 11, 11 are secured to the reach C to extend downwardly, and the yoke 10 is pivotally mounted by trunnions 12, 12 between these brackets. As stated, the block 9 is mounted to slide in the yoke 10, and springs 13 and 14 are mounted to be above and below this slide block.

In Fig. 2, the same reference characters are used, the essential difference being that the forward end of the reach C' is connected to the one side of a full elliptical spring 15, which at its opposite side is secured to one member of a universal joint 16, the other member of which is carried by a cross bar 17 of the frame. In this form, the entire reach structure has movement, and the connection between the axle and the frame is at a fixed point, which is the universal joint 16.

In the disclosure in Fig. 3, the frame, supporting wheels, axle and housing are the same. However, the toggle G is connected across the frame between the side members, as better shown in Fig. 4.

This toggle has a set of arms 18 near each end, and draw rods $C^2$ are pivotally connected with these arms and have pivotal connection with the axle housing at 5'. In this adaptation, the rods $C^2$ take the place of, and perform the same function as, the reach C, and by reason of the fact that the two sets of arms must necessarily turn in the same swinging path when the toggle turns, the axle is always maintained in its same right-angular relation with respect to the longitudinal extent of the frame. A third set of arms 19 is positioned to extend downwardly from the toggle at a point near the center.

A torsion rod E' is secured to the axle housing 1 and extends forward to connect with the slide block $9^a$ mounted in the yoke $10^a$ pivoted between the arms 19. The other parts of this yoke are the same as shown in Fig. 6.

Figure 5:
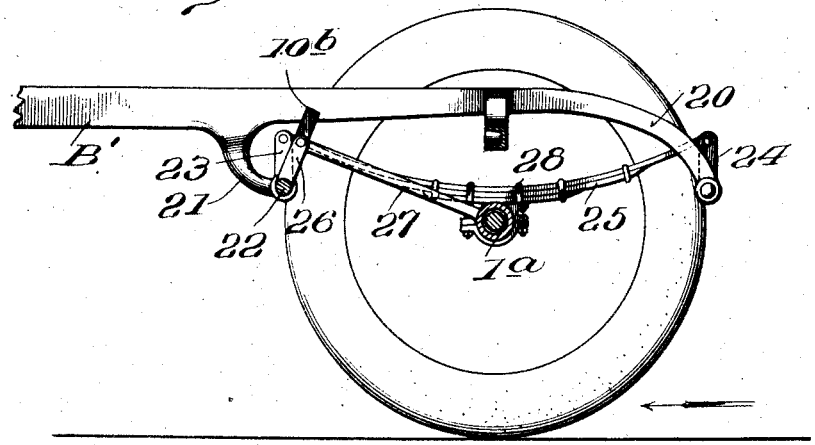
Fig. 5 illustrates the suspension applied to a modified form of load spring.

In Fig. 5 the frame B' is made slightly different in that the ends of the side members are curved downwardly at 20. Brackets 21 are connected with the side members at a point forward of this curved end. A toggle shaft 22 similar to the toggle G is pivoted between the brackets 21.

Arms 23 are connected with this shaft 22 near each end to extend upwardly. Links 24 are connected with the end 20 of the frame, and semi-elliptical load springs 25 are pivotally connected with the arms 23 and with the links 24 so that the axle housing $1^a$ may have movement in the direction of the longitudinal extent of the frame as with the other forms heretofore described, and by reason of the fact that the arms 23 are connected with the toggle shaft 22, and must turn together, the effect is the same as described with reference to Fig. 3, that is, the axle is maintained in its right angular position with respect to the longitudinal extent of the frame.

A third set of arms 26 is provided on the toggle shaft 22, and a yoke $10^b$ is pivotally mounted between these arms. A radius rod 27 is secured to the axle housing $1^a$, and is connected as shown in Fig. 6 with the yoke $10^b$. A pivotal connection is provided at 28 between the axle housing and the semi-elliptical spring 25 to permit the movement of the axle housing.

In each of the disclosures, the structure, while varied in a mechanical way, is substantially the same in its operation, and the essential feature, namely the connection of the radius rod with a part of the structure mounted to have the same movement as the axle, and to resiliently permit twisting of the axle housing is accomplished.

While I have shown the invention applied in several connections, it is evident that it is adaptable, with slight modifications, in any connection where the axle is permitted to have movement with respect to the frame, as set forth, and hence I do not wish to limit myself to the exact structure herein set forth, but:—

I claim:

1. The combination with a vehicle frame and axle-housing, of load springs connected between said parts to permit movement of the axle-housing in the direction of the longitudinal extent of the frame, means extending from the axle-housing and connected with the frame to permit said movement and to hold the axle-housing against twisting or side movement, the connection between the axle-housing and load springs formed to permit turning movement of the axle-housing, and means connected with the axle-housing and resiliently connected with said first means to resiliently oppose said turning movement and to restore the parts to normal when the turning strain is released.

2. The combination with a vehicle frame and axle-housing, of load springs connected between said parts to permit movement of the axle-housing in the direction of the longitudinal extent of the frame, means connected between the axle-housing and frame to permit said movement of the axle-housing and to preclude twisting or side movement, the connection between the axle-housing and load springs formed to permit turning movement of the axle-housing, a torsion rod secured to the axle-housing and resiliently connected with said means for holding the axle-housing against twisting movement to oppose the turning movement and to restore the parts to normal when the turning strain is removed.

3. The combination with a vehicle frame and axle-housing, of load springs connected between said parts to permit movement of the axle-housing in the direction of the longitudinal extent of the frame, a reach connected between the axle-housing and frame to permit said movement and acting to preclude twisting or side movement of the axle-housing, the connection between the axle-housing and load springs formed to permit turning movement of the axle-housing, and means connected between the axle-housing and the reach to resiliently oppose said turning movement and to restore the parts to their normal position when the turning strain is removed.

4. The combination with a vehicle frame and axle-housing, of load springs connected between said parts to permit movement of the axle-housing in the direction of the longitudinal extent of the frame, a reach connected between the axle-housing and frame to permit said movement and acting to preclude side or twisting movement of the axle-housing, the axle-housing mounted with respect to the springs and reach to have turning movement, and a torsion rod connected between the reach and the axle-housing to resiliently oppose said turning movement and to restore the axle-housing to its normal position when the turning strain is removed.

5. The combination with a vehicle frame and axle-housing, of load-springs connected between said parts to permit movement of the axle-housing in the direction of the longitudinal extent of the frame, a reach connected between the axle-housing and frame to permit said movement and to preclude side or twisting movement of the axle-housing, said axle-housing connected to have turning movement with respect to the load springs and the reach structure, a torsion rod secured to the axle-housing and a resilient connection formed between the free end of the torsion rod and the reach to oppose the turning movement of the axle-housing and to restore the parts to normal when the turning strain is released.

6. The combination with a vehicle frame, springs and axle-housing, of means connected to frame and axle-housing to maintain the axle-housing at right-angles to the line of draft and resiliently oppose its relative horizontal movement, and additional means connected to the first-named means to resiliently oppose the turning movement of the axle-housing about its axis.

7. The combination with springs, of a vehicle frame and axle-housing and means mounted between them to maintain the axle-housing at right-angles to the line of draft, resiliently oppose its longitudinal movement, and resiliently oppose its turning movement about its axis.

8. The combination with springs, of a vehicle frame and axle-housing and means mounted between them to maintain the axle-housing at right-angles to the line of draft, and resiliently oppose its relative horizontal movement and its turning movement about its axis.

9. The combination of a vehicle frame and axle-housing, of springs mounted between them, means between frame and axle-housing to maintain the axle-housing at right-angles to the line of draft, and means connected with said means to resiliently oppose turning movement of the axle-housing about its axis.

10. In combination with a vehicle frame, an axle-housing, load springs connected between said parts to permit relative horizontal movement of axle-housing and frame, means to maintain the axle-housing at right-angles to the line of draft and resiliently oppose its horizontal movement, and means attached thereto to resiliently oppose turning movement of the axle-housing about its axis.

In testimony whereof I affix my signature, in the presence of two witnesses.

ROLLAND S. TROTT.

Witnesses:
A. L. OLMSTED,
ALBERT R. BURGHARDT.